United States Patent
Park

(10) Patent No.: US 8,267,539 B2
(45) Date of Patent: Sep. 18, 2012

(54) LIGHT EMITTING MODULE, AND LIGHT SOURCE AND DISPLAY DEVICE HAVING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 312 days.

(21) Appl. No.: 12/698,394

(22) Filed: Feb. 2, 2010

(65) Prior Publication Data

US 2010/0208452 A1    Aug. 19, 2010

(30) Foreign Application Priority Data

Feb. 13, 2009  (KR) ...................... 10-2009-0011957

(51) Int. Cl.
 *G02F 1/13357* (2006.01)
(52) U.S. Cl. ....................................... 362/97.3; 362/97.2
(58) Field of Classification Search ......... 362/97.1–97.3
See application file for complete search history.

(56) References Cited

U.S. PATENT DOCUMENTS

| | | | |
|---|---|---|---|
| 2007/0047257 A1* | 3/2007 | Yamamoto | .................... 362/613 |
| 2008/0143916 A1 | 6/2008 | Fujino et al. | |

FOREIGN PATENT DOCUMENTS

| | | |
|---|---|---|
| CN | 101109871 A | 1/2008 |
| EP | 1 881 362 | 1/2008 |
| KR | 20-0407406 | 1/2006 |
| KR | 10-2007-0057462 | 6/2007 |
| KR | 10-0860063 | 9/2008 |
| WO | WO 2007/124276 | 11/2007 |
| WO | WO 2008/018709 | 2/2008 |
| WO | WO 2009/022661 | 2/2009 |

OTHER PUBLICATIONS

Korean Office Action issued in KR Application No. 10-2009-0011957 dated Aug. 31, 2010.
Chinese Office Action dated Oct. 26, 2011.
Korean Office Action issued in KR Application No. 10-2009-0011957 dated Feb. 22, 2011.
European Search Report issued in EP Application No. 10153075.6 dated Apr. 27, 2010.

\* cited by examiner

*Primary Examiner* — David V Bruce
(74) *Attorney, Agent, or Firm* — KED & Associates, LLP

(57) ABSTRACT

A light emitting module and a light unit having the same are provided. The light emitting module may include a substrate including a body and a plurality of branches that extend from the body. A plurality of light emitting devices may be provided on the branches. A connector may be coupled to the body, and may be electrically connected to the plurality of light emitting devices.

17 Claims, 6 Drawing Sheets

LIGHT EMITTING MODULE, AND LIGHT SOURCE AND DISPLAY DEVICE HAVING THE SAME

CROSS-REFERENCE TO RELATED APPLICATIONS

This claims priority under 35 U.S.C. 119 and 35 U.S.C. 365 to Korean Patent Application No. 10-2009-0011957 (filed in Korea on Feb. 13, 2009), the entirety of which is incorporated herein by reference.

BACKGROUND

1. Field

This relates to a light emitting module and a light source having the same.

2. Background

A liquid crystal display (LCD) may be used in various electronic devices such as, for example, a computer monitor, a television, a mobile communication terminal, a navigation device, and other such devices. Such a LCD may include a backlight unit that directs light onto a back surface of the LCD because the LCD is a non-luminous display device. Cold cathode fluorescent lamps may be used as a light source. Alternatively, a light emitting diode (LED) may be used as a light source. Such an LED may be used as a backlight unit of an LCD as well as a light source device for various types of apparatuses requiring light.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings.

Figure 1:
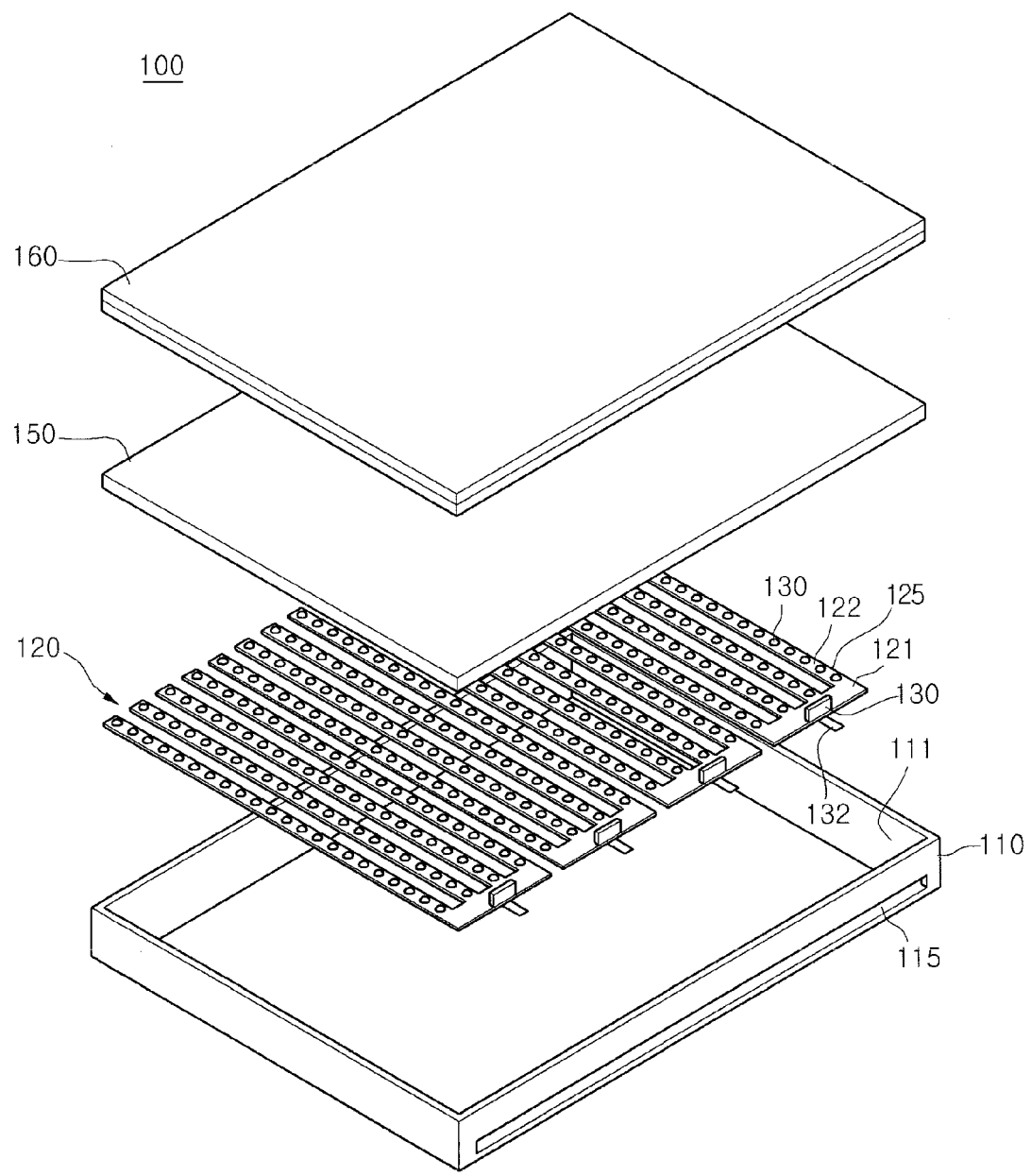
FIG. 1 is a perspective view of a display device according to an embodiment as broadly described herein.
Figure 2:
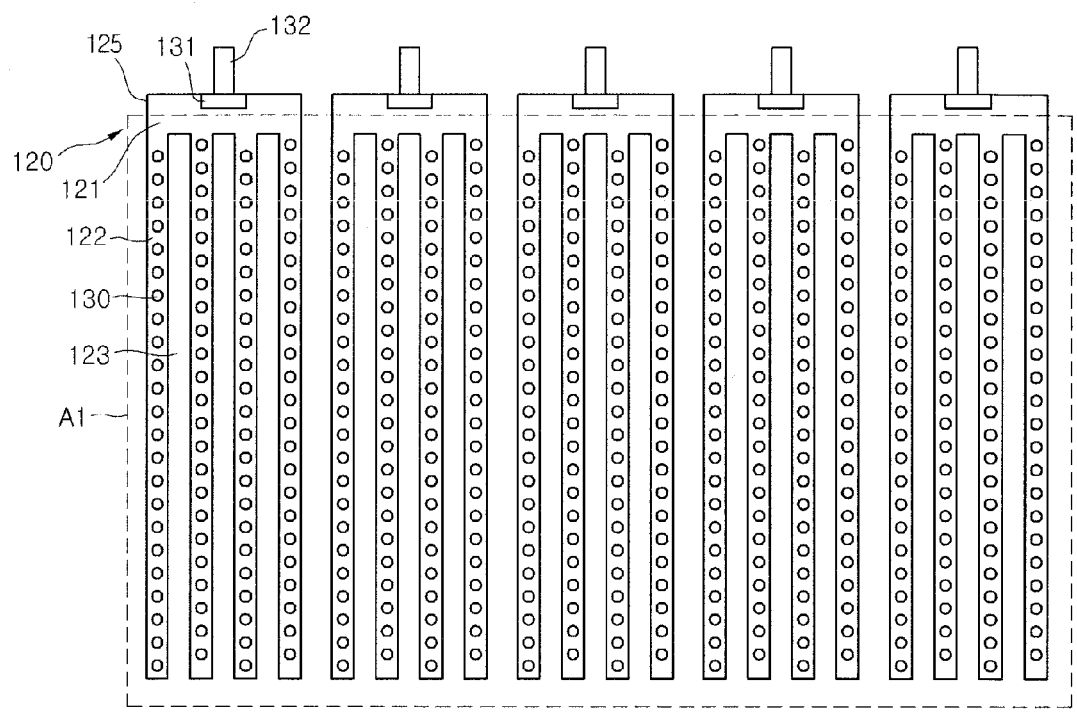
FIG. 2 is a plan view of a light emitting module of the display device shown in FIG. 1.

Referring to FIGS. 1 and 2, a display device 100 as embodied and broadly described herein may include a cover 110, a light emitting module 120, an optical sheet 150, and a display panel 160. The bottom cover 110, the light emitting module 120, and the optical sheet 150 may serve as a light source.

A receiving part 111 having a predetermined depth may be defined in the cover 110. The receiving part 111 may have a flat bottom surface and sidewalls that extend substantially perpendicular to the bottom surface, or that are inclined with respect to the bottom surface. The sidewalls may or may not include a separate structure. The cover 110 may be formed of one of aluminum (Al), magnesium (Mg), zinc (Zn), titanium (Ti), hafnium (Hf), niobium (Nb), or other material as appropriate.

At least one light emitting module 120 is provided on the bottom cover 110. in the embodiment shown in FIG. 1, four light emitting modules 120 are provided. Each light emitting module 120 may include a substrate 125 having a plurality of branched portions and a plurality of light emitting devices 130 provided on the substrate 125.

An opening 115 may be defined in a sidewall of the cover 110. A cable 132 connected to the light emitting module 120 may extend to the outside of the cover 110 through the opening 115. In the embodiment, the opening 115 in the sidewall is an exemplary illustration, and other types of openings may also be appropriate.

Figure 3:
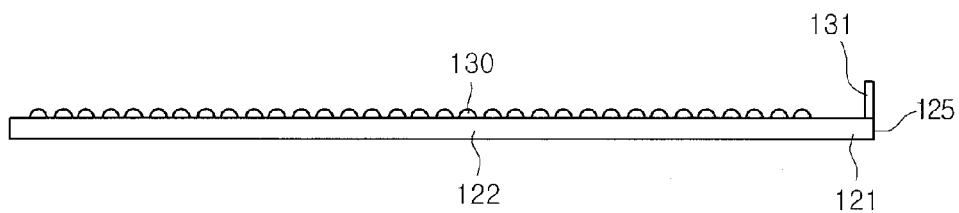
FIG. 3 is a sectional view of the light emitting module shown in FIG. 2.

Referring to FIGS. 1 to 3, the substrate 125 may include a body 121 and at least two branch parts, or branches, 122 that extend from the body 121 and are spaced apart from each other. In the embodiment shown in FIG. 1, the substrate 125 includes four branch parts 122 that extend parallel to each other. Other numbers and arrangements of branch parts may also be appropriate.

The substrate 125 may be formed of one of various materials and include various substrates such as, for example, a flexible printed circuit board (FPCB), a metal core printed circuit board (MCPCB), a FR-4 substrate, a CEM-3, and others as appropriate.

The plurality of branch parts 122 branch from the body 121, and the body 121 may include interconnections between the branch parts 122. For example, a connector 131 electrically connecting the plurality of branch parts 122 to an external controller may be provided on the body 121, and the cable 132 may be connected to the connector 131. In this embodiment, four branch parts 122 having a bar shape are connected to one body 121, and the light emitting devices 130 provided on the four branch parts 122 may be controlled using only one connector 131.

The light emitting devices 130 may be arranged on each of the branch parts 122 in at least one row. Although the light emitting devices 130 are arranged on the branch part 122 in a linear fashion in this embodiment, other arrangements may also be appropriate. For example, the light emitting devices 130 may be arranged on the branch part 122 in two rows or in a zigzag shape.

The light emitting device 130 may be packaged after a light emitting diode (LED) chip is mounted on the branch part 122. Alternatively, the packaged light emitting device 130 may be mounted on the branch part 122. The light emitting device 130 may include a colored LED chip having at least one color (such as, for example, a red LED chip, a green LED chip, or a blue LED chip) or a white LED chip other colors/combinations may also be appropriate.

The plurality of light emitting devices 130 provided on the light emitting modules 120 may be operated by a controller. In certain embodiments, the plurality of light emitting devices 130 of all of the light emitting modules 120 may be operated by the same control signal. In alternative embodiments, the light emitting devices 130 provided on each of the light emitting modules 120 may be separately operated by a respective control unit of the light emitting modules 120. Also, the plurality of light emitting devices 130 disposed on the plurality of branch parts 122 of each of the light emitting modules 120 may be separately operated by a respective control unit of the branch parts 122, or the plurality of light emitting devices 130 disposed on each of the branch parts 122 may be separately operated by a respective control unit of the light emitting devices 130.

Since the light emitting devices 130 may be separately operated based on the particular regions in which they are positioned, a local dimming method may be applicable to the display device of this embodiment. Thus, a contrast ratio of displayed images may be improved, and power consumption may be reduced.

The light emitting module 120 may be positioned on a bottom surface of the cover 110. The bottom surface may have a flat structure, an uneven structure, or an inclined structure.

Referring to FIG. 2, each branch part 122 is disposed within a display region A1 of the display device. Spaces 123 between adjacent branch parts 122 may have substantially the same width, or may have different widths in the plurality of light emitting modules 120.

For example, the branch parts 122 provided at peripheral regions of two opposite sides of the cover 110 may be arranged to have a first distance therebetween, the branch parts 122 provided at a central region of the cover 110 may be arranged to have a second distance therebetween. The first distance may be greater or less than the second distance, or the first distance and the second distance may be equal to each other.

The optical sheet 150 is provided on the light emitting module 120 and spaced a predetermined distance from the light emitting module 120. The optical sheet 150 may include at least one sheet or film. For example, the optical sheet 150 may selectively include a diffusion sheet, a prism sheet, an illuminance enhancement film, a protection sheet, or other type of sheet as appropriate. The diffusion sheet diffuses incident light, and the prism sheet condenses the incident light. The illuminance enhancement film reflects light again to enhance luminance.

The display panel 160 may be provided on the optical sheet 150. The display panel 160 may be, for example, a liquid crystal display (LCD) panel. The display panel 160 displays information of light irradiated from the light emitting module 120.

A substrate manufacturing process of the light emitting module shown in FIGS. 1-3 will now be described.

Figure 4:
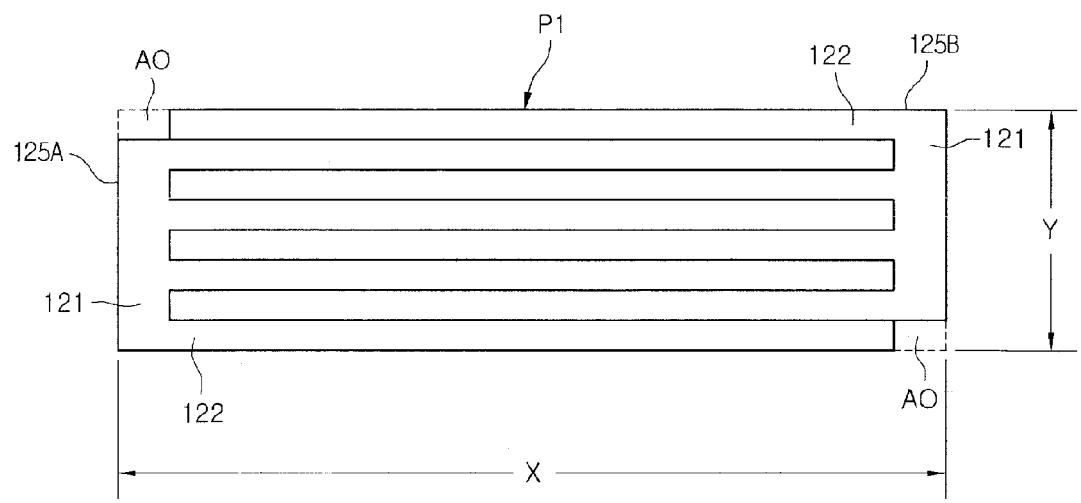
FIGS. 4 and 5 illustrate a substrate manufacturing process of the light emitting module shown in FIGS. 1-3.

Referring to FIG. 4, an original substrate P1 having a substantially rectangular shape may be divided into a body 121 of a first substrate 125A and a body 121 of a second substrate 125B. By cutting the original substrate P1 at the body 121 of the first substrate 125A to form a plurality of branch parts 122, a plurality of branch parts 122 may also be formed for the body 121 of the second substrate 125B. That is, the original substrate P1 may be cut to manufacture the first and second substrates 125A and 125B each including a body 121 and branch parts 122.

The number of the first and second substrates 125A and 125B formed from the substrate P1 may be determined according to a length X and width Y of the original substrate P1. The length X and width Y of the original substrate P1 may also determine a width and length of the branch parts 122, and a distance between adjacent branch parts 122. A corner portion AO of the original substrate P1 may be used for installing an electric device, or may be discarded or remain unused.

In the display device shown in FIGS. 1-3, the original substrate P1 having a substantially rectangular shape may not necessarily be used as it is. That is, the original substrate P1 may be processed so that the substrate 125 includes the body 121 and the branch parts 122. Thus, an area of the substrate 125 on which the light emitting devices 130 are provided may be reduced in approximately half to reduce costs and weight of the display device.

The two substrates 125A and 125B may have substantially the same configuration. When the original substrate P1 is cut to form the branch parts 122, the original substrate P1 may be cut in, for example, a linear shape, a parabolic shape having a predetermined curvature, or other shape as appropriate. Also, when a distance between adjacent branch parts 122 of the first substrate 125A increases, a distance between adjacent branch parts 122 of the second substrate 125B decreases. Such distances may be determined based on a module application environment.

A process in which the original substrate P1 is processed to manufacture the two substrates 125A and 125B may be performed in following order. The light emitting devices 130 may be mounted on the original substrate P1, and then the original substrate P1 may be cut. Alternatively, the original substrate P1 may be cut before the light emitting devices 130 are mounted on the original substrate P1.

Figure 5:
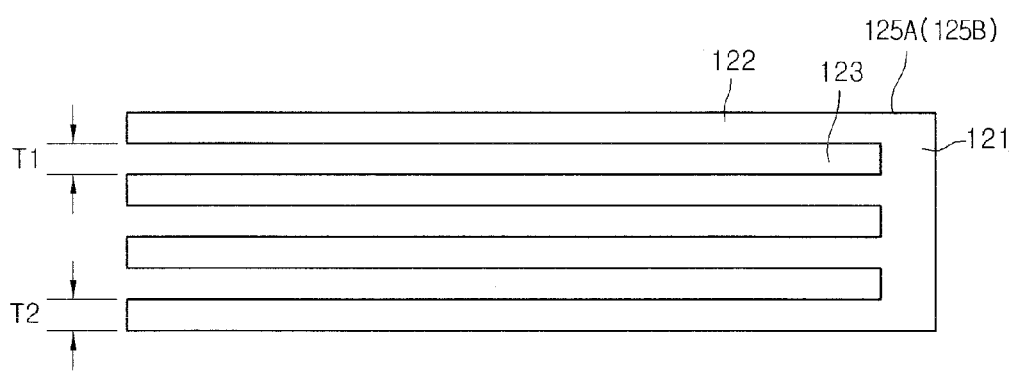

Referring to FIG. 5, the first and second substrates 125A and 125B may include the body 121 and the plurality of branch parts 122, respectively. The branch parts 122 may have substantially the same width T2, and distances T1 between adjacent branch parts 122 may be substantially equal to each other. As a result, two substrate 125A and 125B having substantially the same size and configuration may be manufactured using one original substrate P1.

Figure 6:
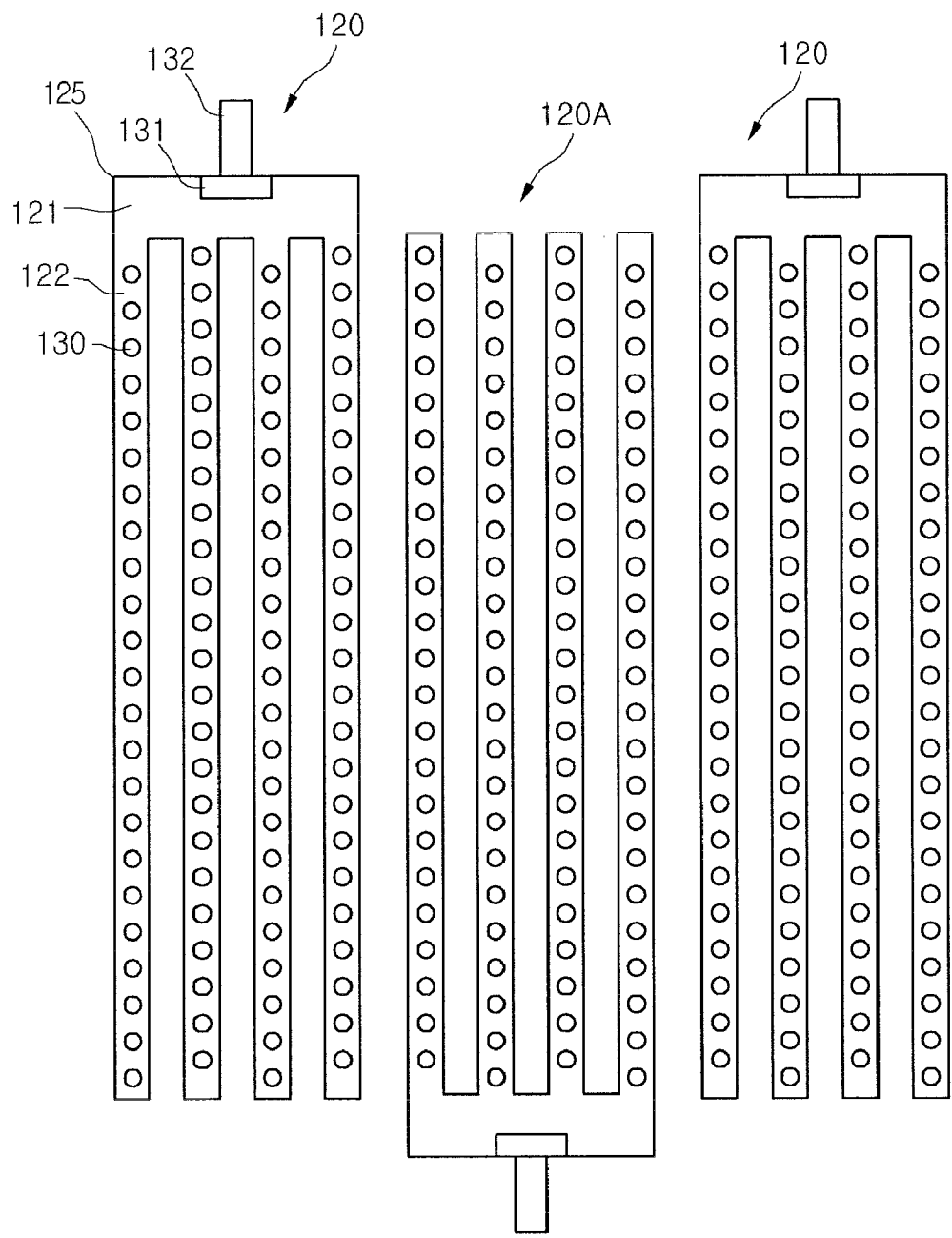
FIG. 6 is a plan view of a light emitting module according to an embodiment as broadly described herein.

FIG. 6 is a plan view of a light emitting module according to another embodiment as broadly described herein. Referring to FIG. 6, a plurality of first light emitting modules 120 and a plurality of second light emitting modules 120A may be alternately arranged. A body 121 may be positioned at a first end of the light emitting module 120, with branch parts 122 extending therefrom toward a second end. A body 121 may be positioned at the second end the light emitting module 120A, with branch parts 122 extending therefrom toward the first end.

When the first and second light emitting modules 120 and 120A are alternatively positioned as described above, a connector 131 may be provided for each body 121 at the first and second ends. Openings 115 for a cable 132 connected to the connectors 131 may be provided in two corresponding sides of the cover 110.

Figure 7:
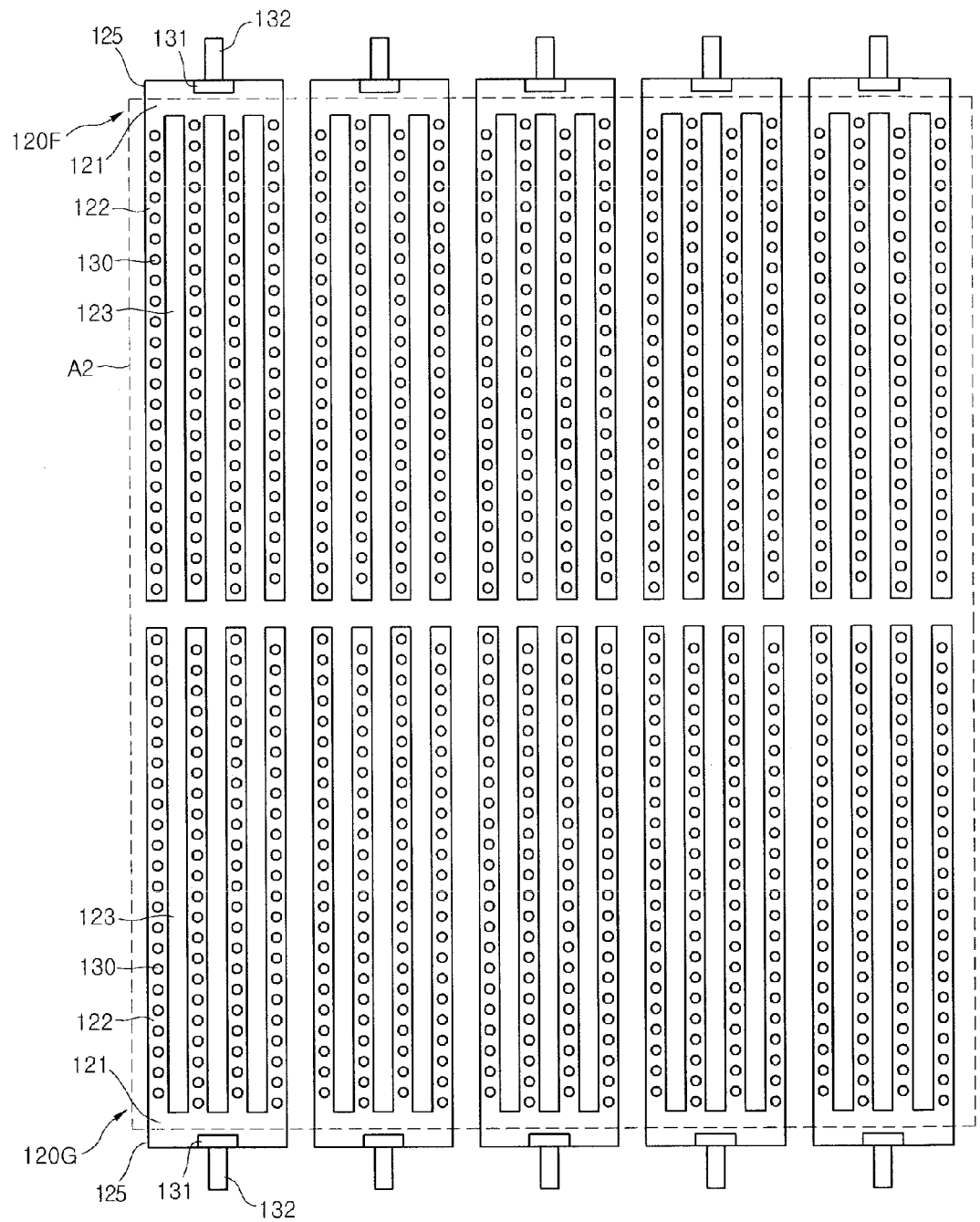
FIG. 7 is a plan view of a light emitting module according to another embodiment as broadly described herein.

FIG. 7 is a plan view of a light emitting module according to another embodiment as broadly described herein. Referring to FIG. 7, a plurality of first light emitting modules 120F may be positioned with a body 121 at a first end, and a plurality of second light emitting modules 120G may be positioned with a body 121 at a second end of the display area. More specifically, in the first light emitting modules 120F, the body 121 is positioned in a display region A2 at a first end of display device, with the branch parts 122 extending from the body 121 toward a central portion of the display region A2. In the second light emitting modules 120G, the body 121 is positioned in the display region A2 at a second end of the display device, with the branch parts 122 extending from the body 121 toward the central portion of the display region A2. The branch parts 122 of the first light emitting module 120F and the branch parts 122 of the second light emitting module 120G may be spaced apart by a predetermined distance from each other at the central portion of the display region A2. The first light emitting module 120F and the second light emitting module 120G may be symmetrically positioned with respect to the central portion of the display region A2. Other arrangements may also be appropriate.

Figure 8:
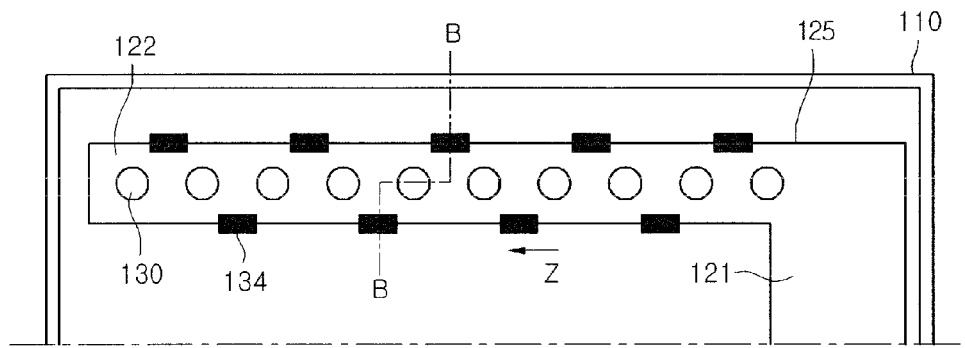
FIG. 8 illustrates a fixing method of a branch part in the light emitting module shown in FIGS. 1-3.
Figure 9:
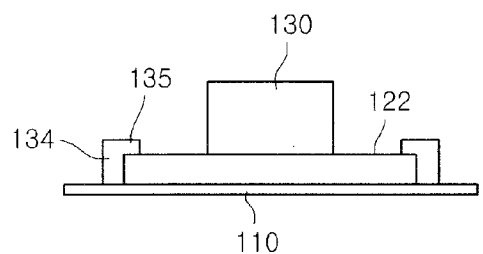
FIG. 9 is a side sectional view taken along line B-B of FIG. 8.

FIG. 8 illustrates a fixing method of a branch part 122 in the light emitting module, and FIG. 9 is a side sectional view taken along line B-B of FIG. 8. Referring to FIGS. 8 and 9, a plurality of hooks 134 may be provided at the bottom surface of the cover 110, spaced apart from each other by a predetermined distance in a certain direction. The hooks 134 may be coupled to respective branch parts 122 along two opposite side edges of the branch part 122 of the substrate 125.

The branch part 122 of the substrate 125 may slide in a direction Z substantially parallel to the bottom surface of the cover 110 so as to be inserted into the hooks 134 and coupled to and supported by the cover 110. The hooks 134 may contact a lateral surface of the branch part 122, and upper ends 135 of the hooks 134 may contact a top surface of the branch part 122. Thus, the branch part 122 may be coupled to and not separated from the cover 110.

In certain embodiments, the hooks 134 may be formed of a material having elasticity. In this case, the branch part 122 of the substrate 125 may be vertically inserted into the hooks 134 at the bottom surface of the cover 110. In alternative embodiments, the hooks 134 may be coupled to the cover 110 to fix the substrate 125 to the cover 110 after the substrate 125 has been positioned on the cover 110.

Figure 10:
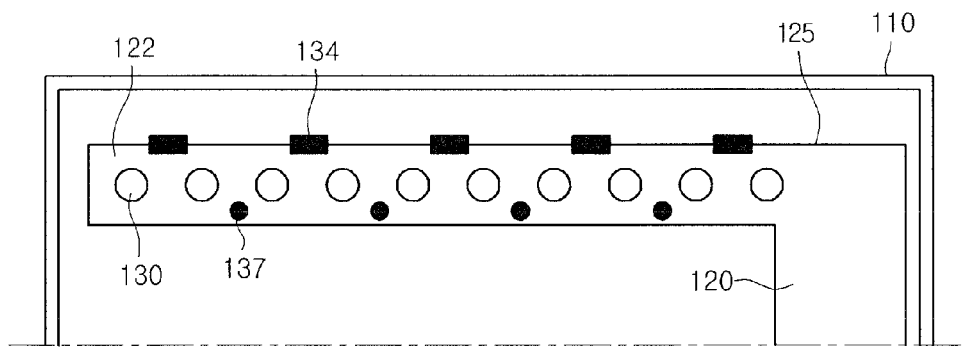
FIG. 10 illustrates another fixing method of the substrate branch part of the light emitting module shown in FIGS. 1-3.

FIG. 10 illustrates another fixing method of the substrate branch part of the light emitting module. Referring to FIG. 10, the branch part 122 of the substrate 125 may have one edge fixed by a plurality of hooks 134, and the other edge fixed by a plurality of fasteners 137, such as, for example, screws so as to firmly fix the substrate 125 to the cover 110.

The above-described light emitting module may be used as a light source such as a lighting device, an indication device, a display device, or other device as appropriate.

A light emitting module including a substrate in which light emitting devices are disposed on a plurality of branch parts and a light unit having the same are provided. An area of the substrate may be decreased and a number of connectors may be reduced so as to reduce manufacturing costs and weight of a display device.

A light emitting module including a module substrate having a novel structure, and a light unit and a display device having the same, are provided.

A light emitting module including a module substrate in which a light emitting device is disposed on parts that are branched into plurality parts, and a light unit and a display device having the same, are provided.

In one embodiment, a light emitting module as broadly described herein may include a substrate comprising a body part and a plurality of branch parts connected to the body part; a plurality of light emitting devices on the branch parts; and a connector coupled to the body part, the connector being electrically connected to the plurality of light emitting devices.

In another embodiment, a light unit as broadly described herein may include a bottom cover; a light emitting module comprising a substrate comprising a body part on the bottom cover and a plurality of branch parts connected to the body part, a plurality of light emitting devices on the branch parts, and a connector coupled to the body part, the connector being electrically connected to the plurality of light emitting devices; and an optical sheet on the light on the light emitting module.

In another embodiment, a display device as broadly described herein may include a bottom cover; a light emitting module comprising a substrate comprising a body part on the bottom cover and a plurality of branch parts connected to the body part, a plurality of light emitting devices on the branch parts, and a connector coupled to the body part, the connector being electrically connected to the plurality of light emitting devices; an optical sheet on the light on the light emitting module; and a display panel on the optical sheet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting module, comprising:
   a substrate, comprising:
      a body; and
      a plurality of branches that extend outward from the body;
   a plurality of light emitting devices provided on the plurality of branches, wherein each of the plurality of branches has light emitting devices arranged thereon in two or more parallel rows or in a zigzag pattern; and
   a connector coupled to the body and electrically connected to the plurality of light emitting devices.

2. The light emitting module of claim 1, wherein the plurality of branches extend from the body in parallel to each other in the same direction.

3. The light emitting module of claim 1, wherein a distance between adjacent branches is substantially equal to a width of each of the plurality of branches.

4. A light source, comprising:
   a cover;
   a plurality of light emitting modules, comprising:
      a substrate positioned on the cover, the substrate comprising a body and a plurality of branches that extend outward from the body;
      a plurality of light emitting devices provided on each of the plurality of branches; and
      a connector coupled to the body and electrically connected to the plurality of light emitting devices; and
   an optical sheet provided on the plurality of light emitting modules.

5. The light source of claim 4, wherein the plurality of branches extend in parallel to each other in the same direction.

6. The light source of claim 4, wherein the plurality of light emitting devices are arranged on each of the plurality of branches in one row.

7. The light source of claim 4, wherein the plurality of light emitting devices are arranged on each of the plurality of branches in two or more parallel rows or in a zigzag pattern.

8. The light source of claim 4, wherein a distance between adjacent branches is substantially equal to a width of each of the plurality of branches.

9. The light source of claim 4, wherein the plurality of light emitting modules comprises:
- at least one first light emitting module having its body positioned at a first end of the cover and its plurality of branches extending toward a second end of the cover opposite the first end; and
- at least one second light emitting module having its body positioned at the second end of the cover and its plurality of branches extending toward the first end of the cover.

10. The light source of claim 9, wherein the plurality of branches of the at least one first and at least one second light emitting modules extend to a central portion of the cover such that distal ends thereof face each other at the central portion of the cover.

11. The light source of claim 10, wherein the at least one first light emitting module comprises a plurality of first light emitting modules all with a respective body positioned at the first end of the cover, and the at least one second light emitting module comprises a plurality of second light emitting modules all with a respective body9 positioned at the second end of the cover.

12. The light source of claim 9, wherein the at least one first light emitting module comprises a plurality of first light emitting modules each with a respective body positioned at the first end of the cover and distal ends of respective branches positioned at the second end of the cover, and wherein the at least one second light emitting module comprises a plurality of second light emitting modules each with a respective body positioned at the second end of the cover and distal ends of respective branches positioned at the first end of the cover, wherein the plurality of first light emitting modules and the plurality of second light emitting modules are alternately arranged on the receiving surface of the cover.

13. The light source of claim 9, wherein the cover comprises a sidewall that extends from an outer peripheral edge of the receiving surface, wherein openings are formed in prescribed portions of the sidewall, wherein the openings are configured to receive a cable therethrough for connection to the connector.

14. The light source of claim 4, further comprising at least one hook coupled to a receiving surface of the cover so as to couple the plurality of branches of at least one of the plurality of light emitting modules to the cover.

15. A display device, comprising:
- a cover having a receiving space formed therein;
- a plurality of light emitting modules arranged on the receiving space of the cover, each comprising:
  - a substrate, comprising a body and a plurality of branches extending therefrom; and
  - a plurality of light emitting devices provided on the plurality of branches;
- an optical sheet positioned adjacent to the plurality of light emitting modules; and
- a display panel positioned adjacent to the optical sheet.

16. The display device of claim 15, wherein the plurality of light emitting modules comprises at least one first light emitting module and at least one second light emitting module, wherein the body of the at least one first light emitting module is positioned at a first end of the cover, with the plurality of branches extending toward a second end of the cover, and the body of the at least one second light emitting module is positioned at the second end of the cover, with the plurality of branches extending toward the first end of the cover.

17. The display device of claim 16, wherein the at least one first light emitting module and the at least one second light emitting module are operated by separate control signals.

* * * * *